(12) United States Patent
Burg et al.

(10) Patent No.: US 12,301,935 B2
(45) Date of Patent: *May 13, 2025

(54) BEHAVIOR MODELING BASED ON CONTENT GENRE

(71) Applicant: Comcast Cable Communications, LLC, Philadelphia, PA (US)

(72) Inventors: Bernard Burg, Menlo Park, CA (US); Ryan March, Sunnyvale, CA (US); Ranjit Padmanabhan, Saratoga, CA (US); Tyler Kareeson, Santa Clara, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,037

(22) Filed: Nov. 8, 2023

(65) Prior Publication Data
US 2024/0259632 A1    Aug. 1, 2024

Related U.S. Application Data

(63) Continuation of application No. 16/702,212, filed on Dec. 3, 2019, now Pat. No. 11,849,180, which is a continuation of application No. 15/668,365, filed on Aug. 3, 2017, now Pat. No. 10,536,748.

(51) Int. Cl.
*H04N 21/442* (2011.01)
*G06F 17/11* (2006.01)
(Continued)

(52) U.S. Cl.
CPC ....... *H04N 21/44226* (2020.08); *G06F 17/11* (2013.01); *G06Q 30/02* (2013.01);
(Continued)

(58) Field of Classification Search
CPC .......... H04N 21/4668; H04N 21/4667; H04N 21/20; G06Q 30/02; G06F 17/11
See application file for complete search history.

(56) References Cited

U.S. PATENT DOCUMENTS 7,673,088 B2   3/2010  Horvitz et al.
10,078,694 B2  9/2018  Maharajh et al.
(Continued)

FOREIGN PATENT DOCUMENTS

WO   WO-2004091187 A2 * 10/2004 ........... H04N 21/252

OTHER PUBLICATIONS

U.S. Appl. No. 16/702,212, filed Dec. 3, 2019, Bernard Burg (Comcast Cable Communications, LLC).
(Continued)

Primary Examiner — Cao H Nguyen
(74) Attorney, Agent, or Firm — Ballard Spahr LLP

(57) ABSTRACT

Disclosed are systems and methods for behavioral modeling based on content genre and utilizing results for content recommendation and other network handling and storage of the content. Viewing events with respect to a content item are aggregated. An affinity is calculated based on the viewing events. Additional viewing events occurring during the delivery of the content item and associated with other content items are also selected. A sampling bonus is added to the affinity if these additional viewing events have a duration below a threshold and the other content items share a same genre as the content item.

28 Claims, 10 Drawing Sheets

(51) Int. Cl.
  *G06Q 30/02* (2023.01)
  *H04N 21/20* (2011.01)
  *H04N 21/431* (2011.01)
  *H04N 21/45* (2011.01)
  *H04N 21/466* (2011.01)
  *H04N 21/47* (2011.01)

(52) U.S. Cl.
  CPC ......... *H04N 21/20* (2013.01); *H04N 21/4312* (2013.01); *H04N 21/4667* (2013.01); *H04N 21/4668* (2013.01); *H04N 21/4532* (2013.01); *H04N 21/47* (2013.01)

(56) References Cited

U.S. PATENT DOCUMENTS

| | | |
|---|---|---|
| 10,356,480 B2 | 7/2019 | Hou et al. |
| 10,536,748 B2 | 1/2020 | Burg et al. |
| 2003/0208755 A1 | 11/2003 | Zimmerman |
| 2012/0079518 A1* | 3/2012 | Wan .................... H04N 21/4532 725/9 |
| 2013/0018896 A1 | 1/2013 | Fleischman et al. |
| 2014/0149425 A1 | 5/2014 | Kalmes et al. |
| 2014/0215506 A1 | 7/2014 | Kalmes et al. |
| 2015/0370818 A1 | 12/2015 | Des Jardins et al. |
| 2016/0234184 A1 | 8/2016 | Liu et al. |
| 2016/0259797 A1 | 9/2016 | Lewis et al. |
| 2017/0185601 A1* | 6/2017 | Qin ........................ G06Q 50/01 |
| 2017/0347155 A1* | 11/2017 | Cannistraro ....... H04N 21/4826 |
| 2018/0183886 A1 | 6/2018 | Newell et al. |
| 2018/0184157 A1 | 6/2018 | Newell et al. |
| 2019/0045264 A1 | 2/2019 | Burg et al. |

OTHER PUBLICATIONS

U.S. Appl. No. 15/668,365, filed Aug. 3, 2017, Bernard Burg (Comcast Cable Communications, LLC).

* cited by examiner

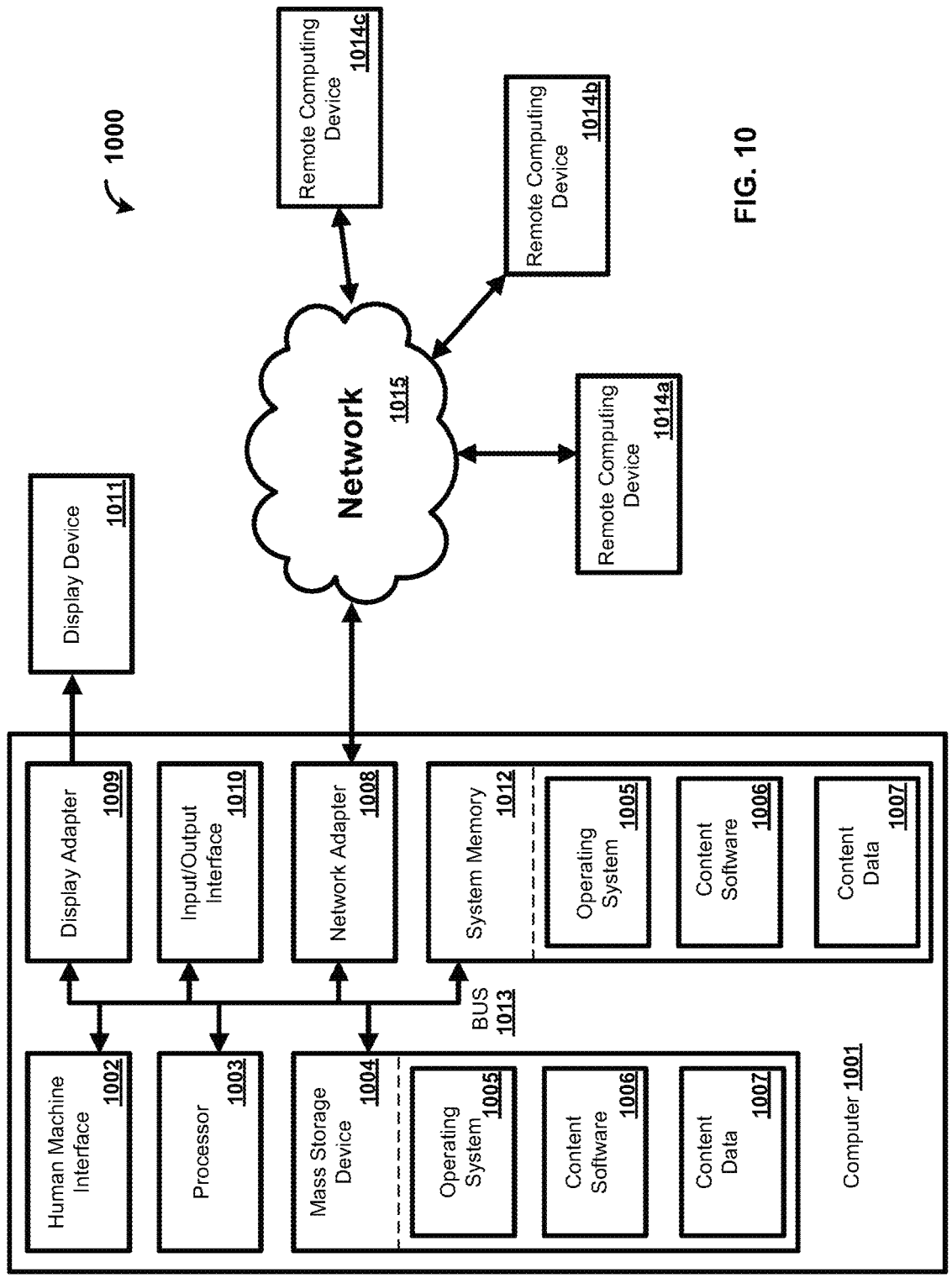

BEHAVIOR MODELING BASED ON CONTENT GENRE

CROSS REFERENCE TO RELATED PATENT APPLICATIONS

This application claims priority under 35 U.S.C. § 120 to, and is a continuation of, U.S. patent application Ser. No. 16/702,212, filed Dec. 3, 2019, which claims priority under 35 U.S.C. § 120 to, and is a continuation of, U.S. patent application Ser. No. 15/668,365, filed Aug. 3, 2017, now U.S. Pat. No. 10,536,748, the entire contents of each of which are hereby incorporated herein by reference in their entirety for all purposes.

BACKGROUND

Modeling of user behavior has been applied to content consumption as it relates to the behavior of users consuming the content. Current behavioral modeling focuses on predicting user preferences for what type of content the user prefers. Thus, behavioral modeling can determine that a user is a sports fan and can therefore be used to recommend a sporting event to the user. However, users consuming content exhibit different consumption behaviors based on genre of content consumed. For example, users consuming content in the sports genre exhibit different behaviors with regard to how content is consumed from users consuming content in the movies genre. Current behavioral modeling fails to predict how users consume content, but rather focus on what content the users might want to consume. These and other shortcomings are addressed by the approaches set forth herein.

SUMMARY

It is to be understood that both the following general description and the following detailed description are exemplary and explanatory only and are not restrictive. Provided are methods and systems for behavior modeling based on content genre.

A user's consumption of a content item (e.g., sporting event, movie, etc. . . . ) can be made up of many viewing events. A viewing event can represent some interaction between the user and the content item and/or other content items. For example, starting to watch the content item, changing the channel to watch a different content item, returning to watch the original content item, etc. . . . . These viewing events can be used to determine an affinity with respect to the given content item. For example, the affinity can be calculated as a function of a ratio of the duration of viewed content relative to the duration of the content item. These affinities for given content item (also referred to as "program affinities") can be modified by various affinity modifiers. For example, briefly switching away from viewing the given content item to view or "sample" another content item having the same genre as the given content item can contribute to a "sampling bonus" added to the program affinity. As another example, a weight or "view coefficient" can be used to weight or scale program affinities based on a time, importance, or other factor of the content item viewed. Additionally, program affinities can be aggregated to determine affinities across a genre, series, sports league, or grouping of users, or can be otherwise aggregated. These affinities can be used in various ways. For example, affinities can be used to identify users that are fans of a particular genre, such as sports. Affinities can be used to identify a level of dedication a fan has to the genre. Recommendations for product packages, applications, services, and the like that are tailored to these fans can then be offered to the identified users.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 10 is a block diagram of an example computing device.

DETAILED DESCRIPTION

Figure 1:
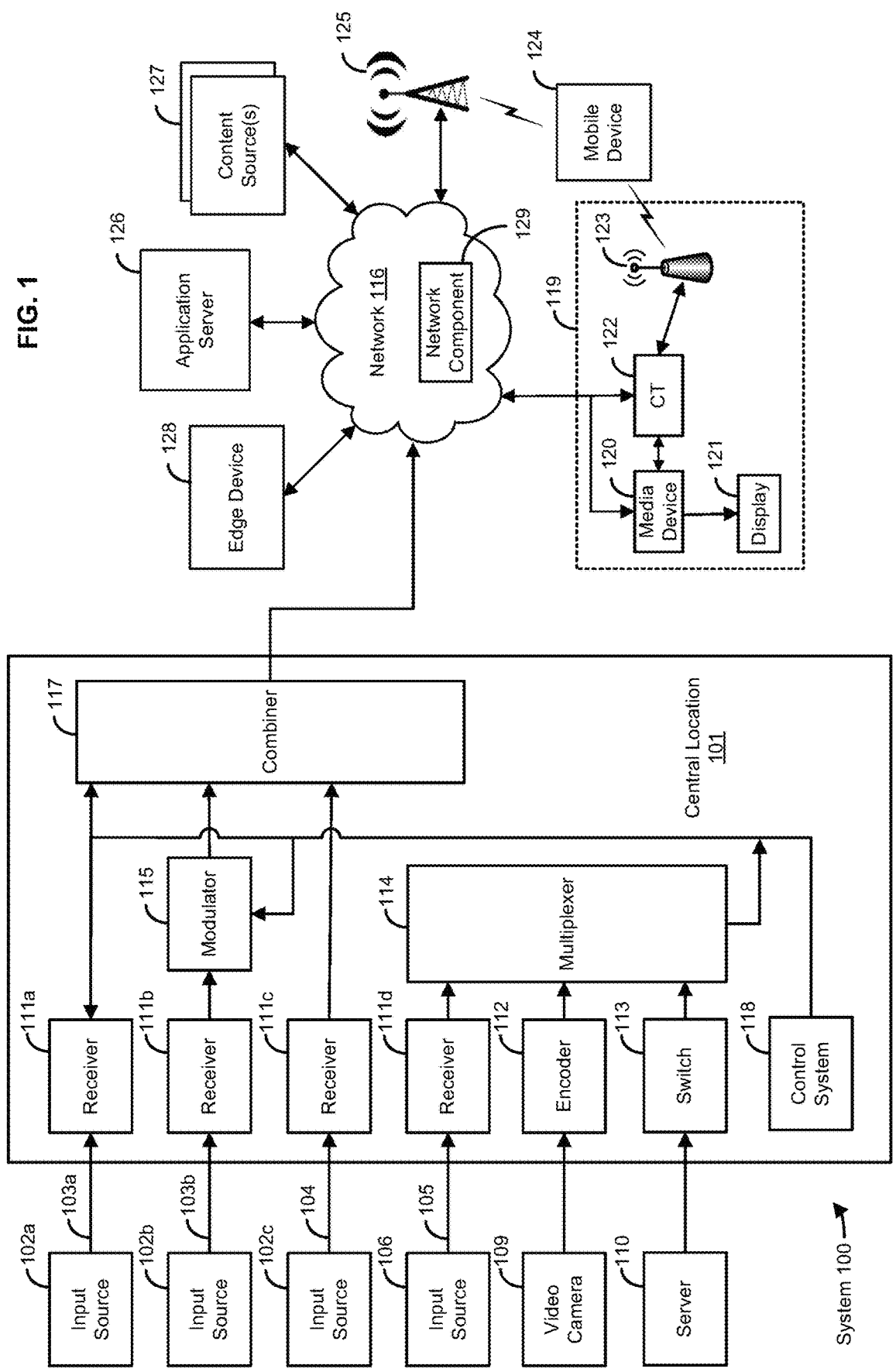
FIG. 1 is a diagram of an example content delivery network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0,1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to behavioral modeling based on content genre. Particularly, the present disclosure relates to modeling user behavior of sports fans (also referred to as sports consumers) based on activities more prevalent to the consumption of sports content items. The methods and systems disclosed can quantify how much content consumers like content items in one or more genres based on the content consumers' behaviors (e.g., actions), also called an affinity towards the genre. The behaviors utilized in the present disclosure relate not just to behaviors that indicate whether a user has an affinity for a genre (e.g., a user watches a number of football games exceeding a threshold amount), but how the user consumes content items within the genre (e.g., while a user is watching a football game, the user changes the channel to one or more other football games). For example, a sports consumer viewing a sports content item (e.g., a game) can periodically switch to other sports content items (e.g., other games) in order to learn the score or state of a particular game. In contrast, a consumer of a movie or television show is more likely to watch a content item (e.g., a movie) without switching to another content item (e.g., another movie). As another example, a sports consumer is more likely to begin or resume watching a game in the middle or near the end of a game. When determining a user's affinity associated with the sports genre (e.g., with respect to a particular game, series, season, team, league, etc.) these behaviors can be taken into consideration. Although the following discussion is presented in the context of the sports genre and sports fans, it is understood that the following discussion is applicable to other genres or categorizations of content items.

Determining an affinity of a user for a particular content item (e.g., a game) can include aggregating viewing events associated with the user. A viewing event can be an event indicating delivery of content to a user device. Examples of viewing events include a selection of a stream of content for delivery to the user device or a tuning of a user device to a channel or frequency for reception of the content item. The viewing events can be aggregated by receiving data indicative of the viewing events generated by a user device associated with the user, such as a mobile device, set top box, or other device for consuming content items. The viewing events can indicate, for example, a particular content item viewed, a start time of viewing, an end time of viewing, a viewing duration, and potentially other data.

To determine the affinity of a user for a particular content item, referred to hereinafter as a "program affinity," viewing events for a particular content item can be selected. Determining the program affinity for the particular content item can include selecting those viewing events having an identifier indicating their association with the particular content item. One or more viewing events for the particular content item can be merged. For example, a first viewing event can be merged with a contiguous second viewing event. A first viewing event can be considered contiguous to a second viewing event when the end time of the first viewing event matches the start time of the second viewing event. As another example, a first viewing event can be merged with a second viewing event when at least a portion of the durations of the first viewing event and second viewing event overlap. As a further example, a first viewing event can be merged with a second viewing event when the end time of the first viewing event and the start time of the second viewing event are separated by a duration below a threshold. In such an example, the program affinity for the particular content item would not be negatively impacted by short deviations in viewing to other content items, or "sampling," as is described in further detail below.

The program affinity for the particular content item can be calculated based on a duration of the particular content item viewed relative to the total duration of the content item. For example, calculating the program affinity for the particular content item can include calculating a summation of the viewing duration of each viewing event corresponding to the particular content item and the user. The summation can then be divided by the total duration of the content item (e.g., the time duration between a start time and an end time of the content item) to calculate the program affinity. As another example, calculating the program affinity for the particular content item can include calculating an average viewing duration of each viewing event corresponding to the content item and the user. The average viewing duration can then be divided by the total duration of the content item to determine the program affinity for the particular content item.

Program can be calculated by applying one or more affinity modifiers. For example, the affinity modifiers can include a sampling bonus. A sampling bonus for a given content item is a bonus based on one or more viewing events for other content items occurring during a delivery of the given content item. The viewing events used to calculate a sampling bonus can include those viewing events having a duration falling below a threshold, indicating a brief period of viewing for the "sampled" other content item. Affinity modifiers can also include weights or "view coefficients" applied to the program affinities. The view coefficients for a given content item can be based on a scheduling of the given content item in a series or season. View coefficients for the given content item can also be determined based on a significance of an event corresponding to the content item, such as a rivalry game, a key game in a series or season, or an otherwise significant event.

One or more program affinities, or aggregate affinities based on multiple program affinities, can be used to generate a recommendation for a user. For example, a program affinity or aggregate affinity can indicate an affinity or "fandom" for a particular genre, team, sport, league, or other category of content items. Users can be grouped based on their respective affinities, and recommendations can be generated based on to which grouping a user belongs. The recommendation can include a promotion or advertisement for a content package, product, discount, or other incentive corresponding to the grouping or classification of the user. The recommendation can include a recommendation for one or more content items relevant to the grouping or classification of the user.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

The central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. The network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

A multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or a satellite dish.

The communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

The user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

The user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

The system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

The system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. The content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

The system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

The network 116 can comprise a network component 129. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like.

The content source 127 and/or edge device 128 can serve to deliver content items to user devices, such as the mobile device 124, communications terminal 122, the media device 120, and/or the display device 121. Accordingly, a user device such as the mobile device 124, communications terminal 122, the media device 120, and/or the display device 121 configured to receive a given content item can generate a viewing event detected by the content source 127 and/or edge device 128. The content source 127, edge device 128, or another computing device in communication with the content source 127 or edge device can calculate affinities as set forth below based on the detected viewing events.

Figure 2A:
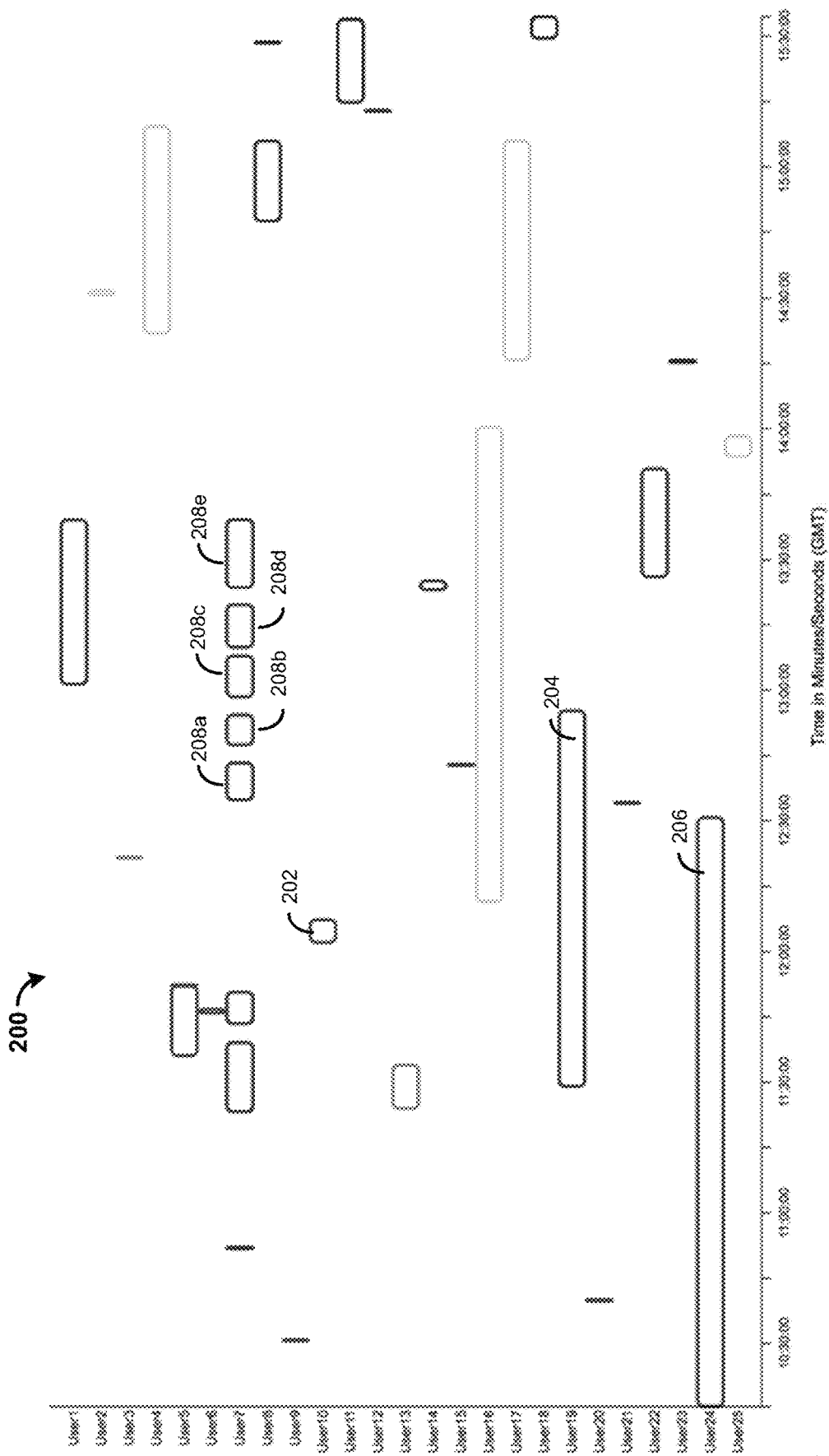
FIGS. 2A and 2B are example timelines of viewing habits with respect to multiple users within a time period.

FIG. 2A is an example timeline 200 of viewing habits for a sampling of users. In this example timeline, the users are drawn from a pool of "typical" users, e.g. users below the ninetieth percentile of affinities. Each entry 202 in the timeline for a respective user indicates a viewing of a program for a duration indicated by the x-axis of the timeline 200. The example timeline 200 serves to illustrate that "typical" users tend to either tune in to a given program for an extended duration, or abandon viewing without resuming viewing. For example, entry 204 shows that user 19 viewed a given program continuously for ninety minutes, while entry 206 shows that user 24 viewed a given program for two and a half hours. Conversely, entries 208a,b,c,d,e show that user 7 viewed a given content program for an hour and a half, but with four deviations from viewing the content program interspersed throughout the viewing period.

Figure 2B:
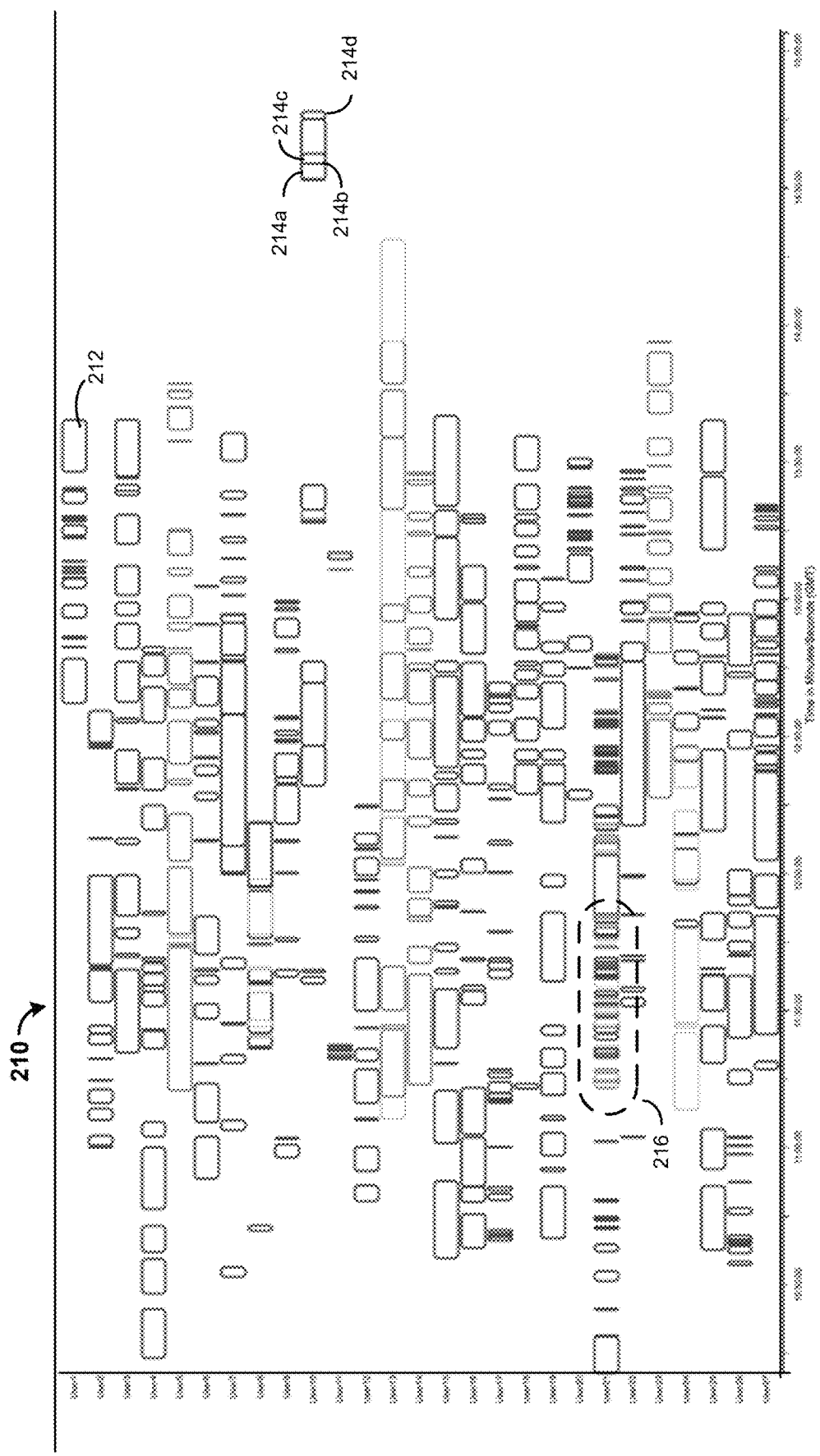

FIG. 2B is an example timeline 210 of viewing habits for a sampling of users. In this example timeline, the users are drawn from a pool of users having a higher affinity for the sports genre. Each entry 212 in the timeline for a respective user indicates a viewing of a program for a duration indicated by the x-axis of the timeline 210. The example timeline 200 serves to illustrate that "fans," e.g. users associated with high affinity values, tend to sample programs repeatedly throughout the duration of the timeline 210. For example, entries 214a,b,c,d serve to show that user 10 viewed a given program (corresponding to entries 214a,c) with two instances of sampling another program (corresponding to entries 214b,d). Conversely, entry group 216 indicates repeated samplings of programs throughout the indicated period.

Figure 3A:
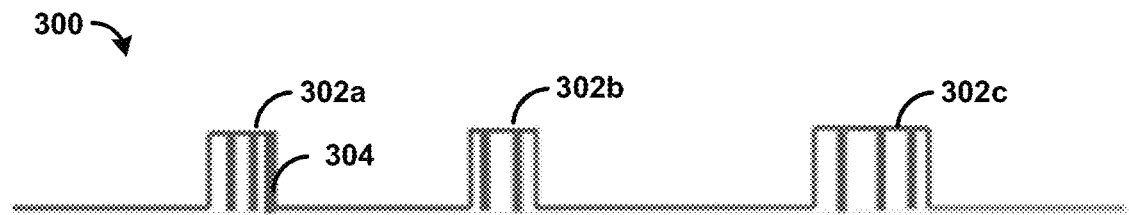
FIGS. 3A, 3B, and 3C are example representations of the relationship between content viewing events and program affinities.

FIG. 3A is an example depiction 300 of the relationship between viewing events and program affinities. Shown is a timeline with timeline entries 302a,b,c each corresponding to a respective content item. Durations of content items can be represented by a width of a respective timeline entry 302a,b,c. Each vertically aligned darkened portion 304 can correspond to a respective viewing event, with a duration of the respective viewing event corresponding to the width of the darkened portion. A program affinity for each content item can be calculated as a function of a ratio of darkened areas to the total area of the respective timeline entry 302a,b,c.

Figure 3B:
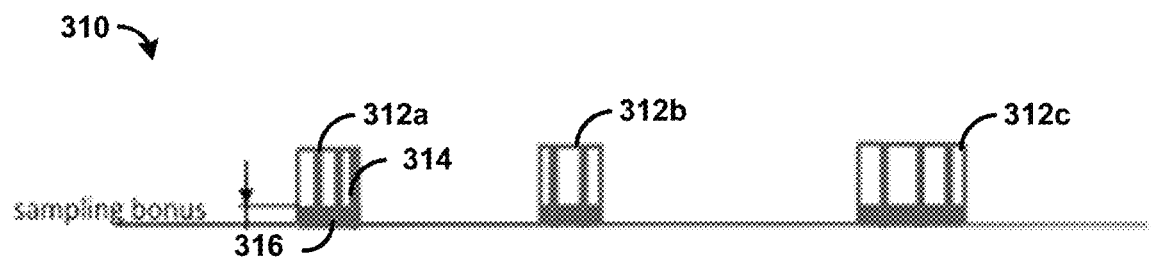

FIG. 3B is an example depiction 310 of the relationship between viewing events and program affinities. Shown is a timeline with timeline entries 312a,b,c each corresponding to a respective content item. Durations of content items can be represented by a width of a respective timeline entry 312a,b,c. Each vertically aligned darkened portion 314 can correspond to a respective viewing event, with a duration of the respective viewing event corresponding to the width of the darkened portion. Also included are horizontally aligned darkened portions 314 representative of a sampling bonus. In this example, the width of the darkened portions 314 correspond to the width of the timeline entry 312a,b,c. In other words, the sampling bonus is based on a duration of the respective content item. Thus, a program affinity for each content item can be calculated as a function of a ratio of darkened areas (including vertically aligned darkened portions 314 and horizontally aligned darkened portions 316) to the total area of the respective timeline entry 312a,b,c.

Figure 3C:
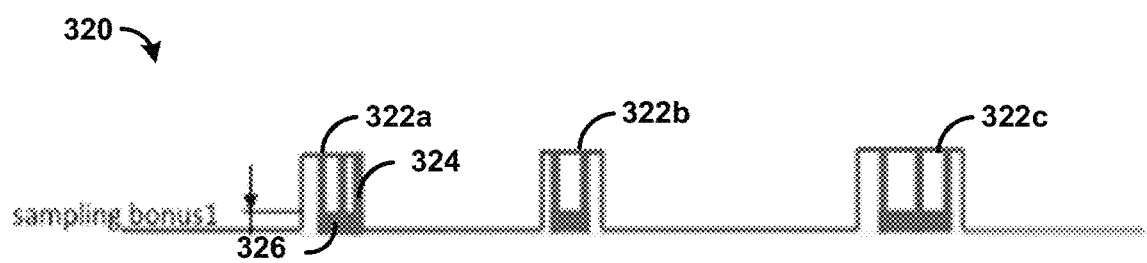

FIG. 3C is an example depiction 320 of the relationship between viewing events and program affinities. Shown is a timeline with timeline entries 322a,b,c each corresponding to a respective content item. Durations of content items can be represented by a width of a respective timeline entry 322a,b,c. Each vertically aligned darkened portion 324 can correspond to a respective viewing event, with a duration of the respective viewing event corresponding to the width of the darkened portion. Also included are horizontally aligned darkened portions 326 representative of a sampling bonus. In this example, the width of the horizontally aligned darkened portions 326 correspond to the duration between the start of a first viewing event and the end of a last viewing event for the respective timeline entry 322a,b,c. Thus, a program affinity for each content item can be calculated as a function of ratio of darkened areas (including vertically aligned darkened portions 324 and horizontally aligned darkened portions 326) to the total area of the respective timeline entry 322a,b,c.

Figure 4A:
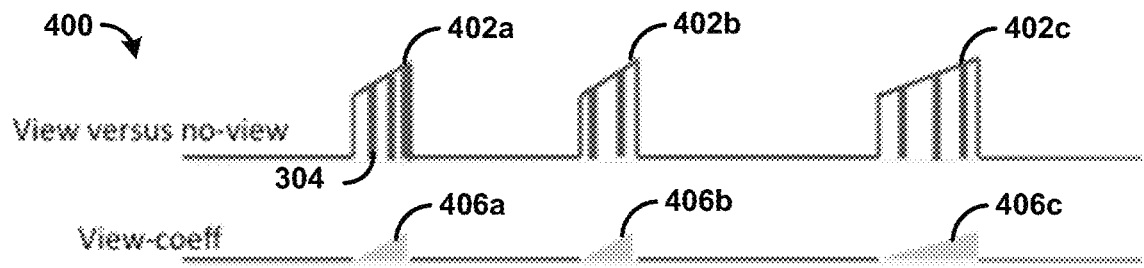
FIGS. 4A, 4B, and 4C are representations of program affinity based on view coefficients.

FIG. 4A is an example representation 400 of the relationship between viewing events and program affinities. Included are timeline entries 402a,b,c representing respective content items. Each timeline entry 402a,b,c includes vertically aligned darkened portions 404 representing viewing events having durations corresponding to the width of the respective vertically aligned darkened portion 404. A respective view coefficient 406a,b,c has been applied to the program affinities for each content item. Thus, viewing events occurring earlier in the content items are weighted less than viewing events occurring later in the content items for the purpose of calculating program affinities.

Figure 4B:

FIG. 4B is an example representation 410 of the effect of view coefficients in relation to program affinities and viewing events. Included are timeline entries 412a,b,c representing respective content items. Each timeline entry 412a,b,c includes vertically aligned darkened portions 414 representing viewing events having durations corresponding to the width of the respective vertically aligned darkened portion 414. A view coefficient 416 has been applied to scale the program affinities for each content item based on a time or date of the respective content item. Thus, program affinities for earlier content items are weighted less than program affinities for later content items. For example, users may abandon or cease to view content items in a given season or series as the season or series goes on. Thus, users still viewing the content items later in the series or season would receive a higher view coefficient representing their higher affinity for the content.

Figure 4C:
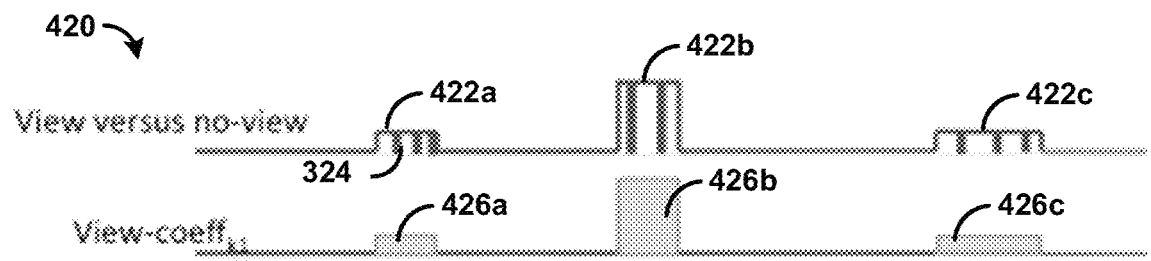

FIG. 4C is an example representation 420 of the effect of view coefficients in relation to program affinities and viewing events. Included are timeline entries 422a,b,c representing respective content items. Each timeline entry 422a,b,c includes vertically aligned darkened portions 424 representing viewing events having durations corresponding to the width of the respective vertically aligned darkened portion 424. A respective view coefficient 426a,b,c has been applied to the program affinities for each content item based on a significance or importance of the respective content item. The significance or importance of the respective content item can be defined by user input. The significance or importance of the respective content item can be determined based on ratings, numbers of viewing events, or other statistics associated with similar content items. Thus, the program affinity for the content item of timeline entry 422b is weighted higher than the program affinity for the content item of timeline entry 422a, whose program affinity is weighted higher than the program affinity for the content item of timeline entry 422c.

Figure 5:
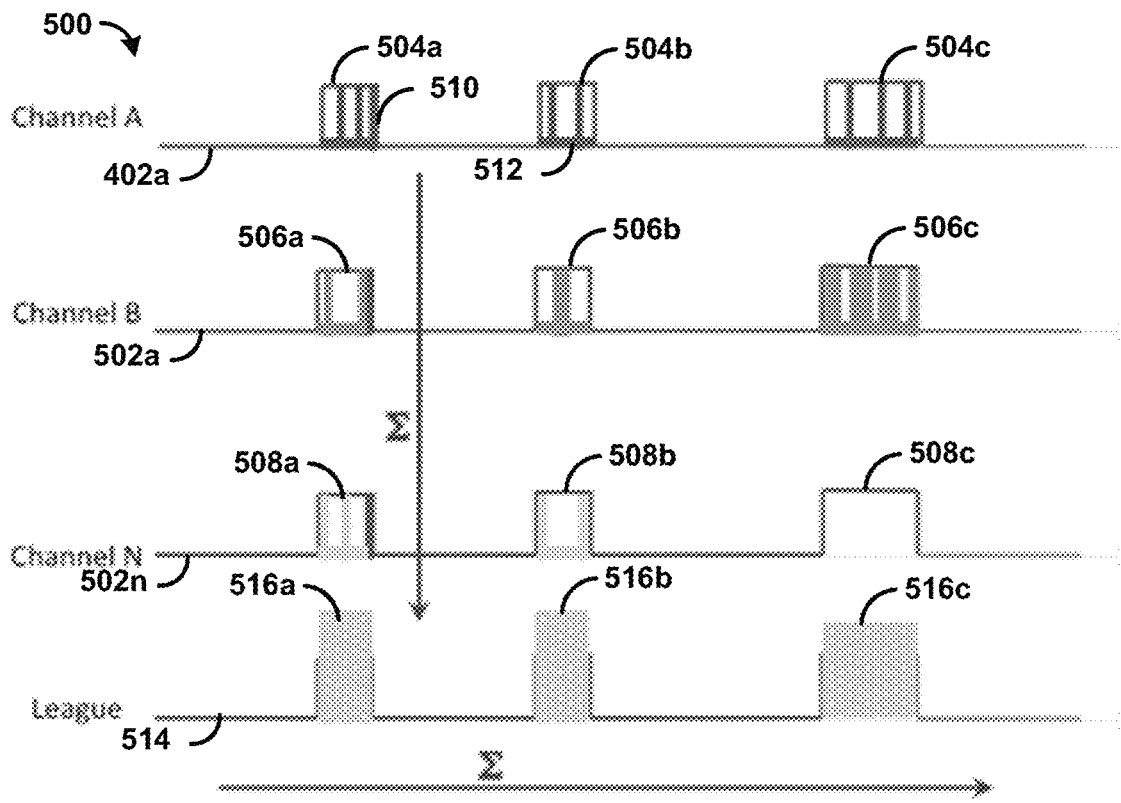
FIG. 5 is a representation of determining aggregated program affinity.

FIG. 5 is an example representation 500 of determining an aggregated program affinity for a user. In this example, program affinities for multiple content items on multiple channels are aggregated to determine an aggregated affinity for a user with respect to a sports league. Included are timelines 502a, 502b, . . . 502n each corresponding to a respective channel A,B or N. Each timeline 502a,b,n includes timeline entries 504a,b,c, 506a,b,c, and 508a,b,c. Each of the timeline entries 504a,b,c, 506a,b,c, and 508a,b,c corresponds to a delivery of a respective content item. In this example, content items for timeline entries 504a, 506a, and 508a are delivered concurrently. Similarly, content items for timeline entries 504b, 506b, and 508b are delivered concurrently, and content items for timeline entries 504c, 506c, and 508c are delivered concurrently.

Vertically aligned darkened portions 510 correspond to viewing events, and horizontally aligned portions 512 correspond to sampling bonuses. The vertically aligned darkened portions 510 and horizontally aligned darkened portions 512 are summed across each of the timelines 502a, 502b, . . . 502n, as represented by an aggregate timeline 514. Aggregate timeline 514 includes timeline entries 516a,b,c indicating, for a user, respective aggregated affinities across multiple content items. These aggregated affinities can then be further summed to determine an aggregated affinity for a user with respect to grouping of events, e.g. games, a specific league, combinations thereof, and the like. Although FIG. 5 depicts a summation to determine an aggregate affinity, it is understood that another aggregate function, e.g. an average, can be used when aggregating program affinities or aggregate affinities.

Figure 6:
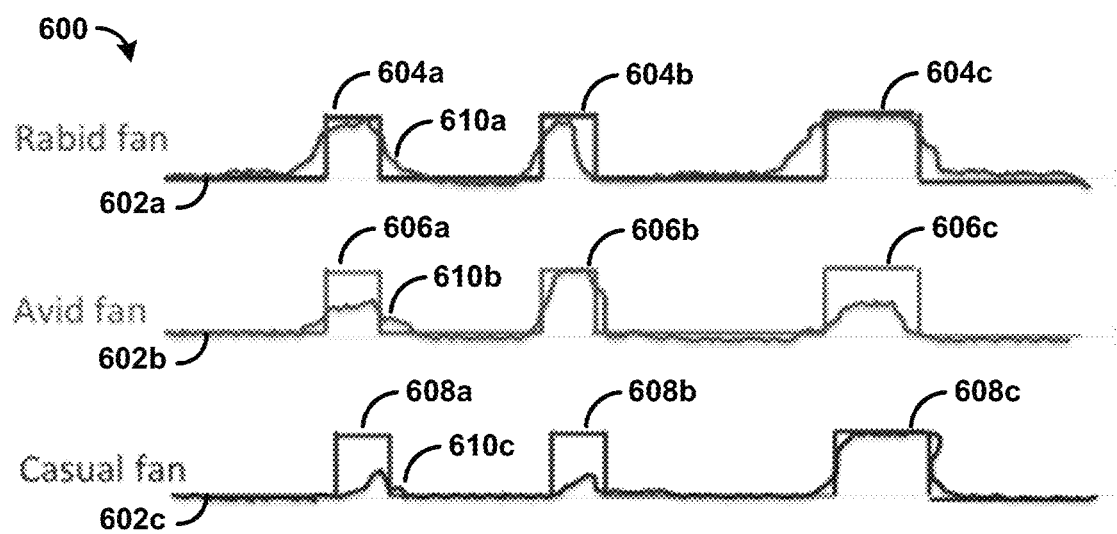
FIG. 6 is a behavioral model based on user groupings according to program affinities.

FIG. 6 is a behavioral model 600 based on user groupings according to program affinities. In this example, users are grouped into one of three categories based on their affinities. The affinities used to group the users can be program affinities for individual content items, or aggregated affinities across multiple content items in a series, season, league, or other grouping. Each of the groups can correspond to a range or threshold of affinity scores of the member users. Included in the behavioral model 600 are three timelines 602a,b,c each corresponding to a "rabid fan" group (indicating a high interest by the users), an "avid fan" (indicating an interest that is less than "rabid" but more than "casual") group, and a "casual fan" (indicating an interest that is less than "avid") group, respectively.

Each timeline 602a,b,c includes timeline entries 604a,b,c, 606a,b,c, and 608a,b,c. Each of the timeline entries 604a,b,c, 606a,b,c, and 608a,b,c corresponds to a delivery of a respective content item. In this example, content items for timeline entries 604a, 606a, and 608a correspond to a same content item. Similarly, content items for timeline entries 604b, 606b, and 608b correspond to a same content item, and content items for timeline entries 604c, 606c, and 608c correspond to a same content item. Each timeline 602a,b,c also includes a line 610a,b,c representing activity of users of the respective grouping. The line 610a,b,c represents a number of users in the respective group viewing a content item at a point in the timeline. Thus, FIG. 6 shows the relationships between a number of viewers of a given content item at a given time based on their respective grouping. For example, line 610 shows that "rabid fans" tend to begin viewing a channel before a given content item begins delivery, and continue to view the channel after the given content item ends. Conversely, "casual fans" may be more prone to viewing a channel through which a content item is delivered after the content item begins, and may cease viewing before the content item ends.

Figure 7:
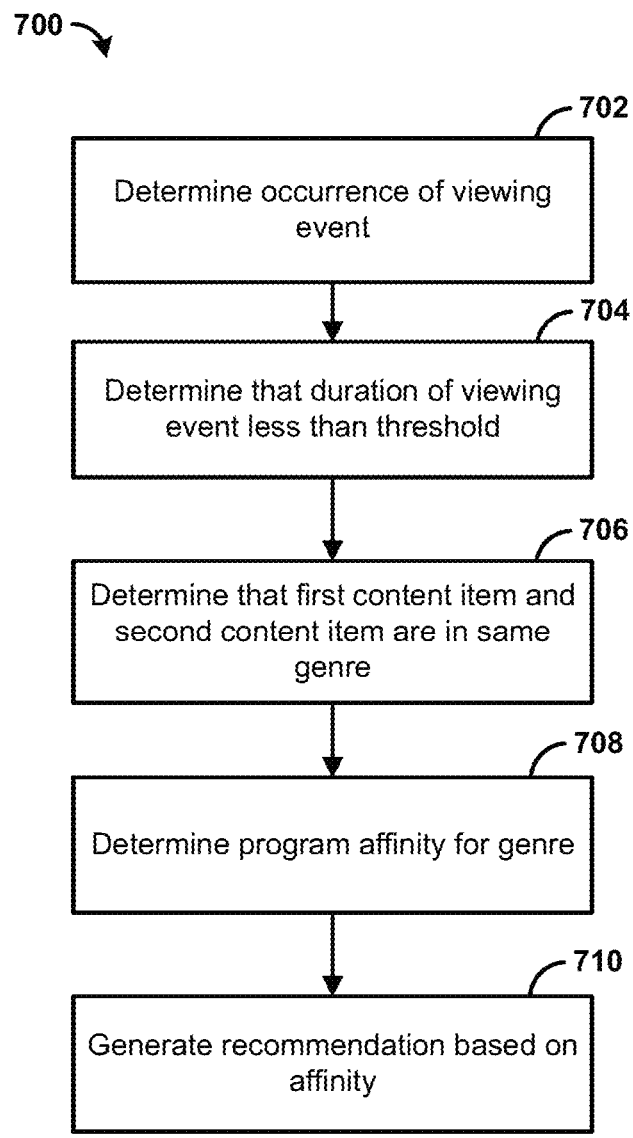
FIG. 7 is a flowchart depicting an example method.

FIG. 7 is a flowchart 700 of an example method. One or more of steps of the method can be performed by a computing device, such as the content source 127 and/or the edge device 128 of FIG. 1. Beginning with step 702, an occurrence of a viewing event can be determined. The viewing event can be associated with a user. Determining the occurrence of the viewing event can include determining, during the delivery of a first content item associated with a first viewing event by the user, an occurrence of a second viewing event associated with a second content item. For example, a user device associated with the user can receive a delivery of a first content item, thereby generating the first viewing event. The user device can include the mobile device 124, communications terminal 122, the media device 120, and/or the display device 121 of FIG. 1. The user device can then instead switch to receiving the second content item, thereby generating the second viewing event. The user device can receive the second content item instead of the first content item in response to a user input, such as a channel change signal, a user interface input, or other input.

Next, in step 704, it can be determined that the duration of the second viewing event has a duration less than a threshold. For example, the threshold can be one second, two seconds, five seconds, ten seconds, 1 minute, 5 minutes, or any other appropriate duration. One skilled in the art can modify the threshold in order to achieve desired results. The second viewing event having the duration less than the threshold can indicate that the user was "sampling" the second content item before returning to the first content item, or switching to another content item. Thus, the second viewing event can contribute to a sampling bonus when determining a program affinity with respect to the first content item, as described herein. Conversely, when the second viewing event has a duration greater than the threshold, it can indicate a switch of user attention away from the first content item on a longer term basis, and can instead contribute to the program affinity with respect to the second content item.

In step 706, in response to determining that the duration of the viewing event is below the threshold, it can be determined that the first content item and the second content item are in the same genre. For example, if the first content item corresponds to a sports game, thereby being in the "sports" genre, it can be determined that the second content item is also in the "sports" genre. Thus, sampling a second content item in the sports genre can indicate a greater affinity for the sports genre, and increase the program affinity with respect to the first content item through a sampling bonus. Determining that the first content item and the second content item are in the same genre can include comparing metadata associated with the first content item and the second content item, respectively. The metadata can be included or associated with one or more data segments of the first and/or second content item. The metadata can be loaded from an electronic program guide (EPG), or another listing or index identifying the first and/or second content item.

Next, in step 708, an affinity for the genre can be determined. This can include determining at least one first affinity based on one or more viewing events associated with the user and the genre. Determining the at least one first affinity based on one or more viewing events associated with the user and the genre can include selecting the one or more viewing events associated with the genre and the user. Selecting the one or more viewing events associated with the genre and the user can include merging one or more viewing events associated with a same content item and the user. For example, a first viewing event and a second viewing event can be merged into a third viewing event when the first viewing event and the second viewing event are contiguous and associated with the same content item. In such an example, the third viewing event can have a start time corresponding to the start time of the first viewing event and an end time corresponding to the end time of the second viewing event.

As another example, the first viewing event and the second viewing event can be merged into a third viewing event when the first viewing event and the second viewing event are separated by a duration below a threshold and associated with the same content item. In such an example, the third viewing event can have a start time corresponding to the start time of the first viewing event and an end time corresponding to the end time of the second viewing event.

As another example, the first viewing event and the second viewing event can be merged into a third viewing event when the first viewing event and the second viewing event at least partially overlap and are associated with the same content item. In examples in which the first viewing event and the second viewing event are merged to generate a third viewing event, the third viewing event can then be merged with a fourth viewing event according to the approaches set forth above.

Determining the at least one first affinity can include calculating the at least one first affinity as at least one summation of the durations of each of the one or more selected viewing events divided by the duration of their respective associated content item. Determining the at least one first affinity can include calculating the at least one first affinity as at least one average of the durations of each of the one or more selected viewing events divided by the duration of their respective associated content item.

Determining the affinity for the genre can include adding at least one sampling bonus to the at least one first affinity based on the second viewing event associated with the second content item. The at least one sampling bonus can be weighted or scaled based on a duration of a first content item. The at least one sampling bonus can be weighted or scaled based on a duration of the first content item viewed. The at least one sampling bonus can be weighted or scaled based on a difference between a start time of a first viewing event for the first content item and an end time of the last viewing event for the first content item. Determining the sampling bonus can include determining a scalar to be applied to one of the durations defined above. The scalar can be dynamically determined based on a duration of sampling, a number of instances of sampling, or another factor. The scalar can be a predefined value for use in determining sampling bonuses. For example, a scalar can be determined or predefined to be 0.2. The scalar can be applied to the total 1800 second (thirty minute) duration of a content item, resulting in a sampling bonus of 360. As another example, a scalar can be increased by 0.1 for each instance of sampling occurring for a given content item. Thus, for four instances of sampling occurring during a given content item, the resulting scalar would be 0.4. When applied to a viewed duration of 1000 seconds, the resulting sampling bonus would be 400. It is understood that the examples above are non-limiting, and that one skilled in the art can determine weights and/or scalars according to a genre and/or the desired results.

After calculating the program affinity, in step 710, a recommendation can be generated based on the affinity. Generating the recommendation can include grouping or classifying the user based on the affinity. A recommendation can then be generated based on the grouping or classification of the user. The recommendation can include a promotion or advertisement for a content package, product, discount, or other incentive corresponding to the grouping or classification of the user. The recommendation can include a recommendation for one or more content items relevant to the grouping or classification of the user.

Figure 8:
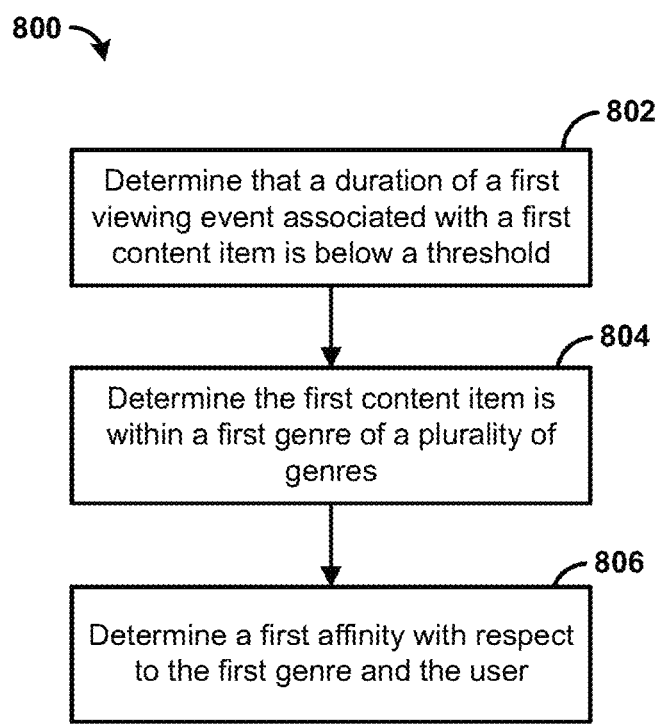
FIG. 8 is a flowchart depicting an example method.

FIG. 8 is a flowchart 800 of an example method. The method can be performed by a computing device such as the content source 127 and/or edge device 128 of FIG. 1, or another computing device as can be appreciated. Beginning with step 802, it can be determined that a duration of a first viewing event associated with a first content item is below a threshold, e.g. one second, five seconds, one minute, five minutes, or any other appropriate duration, thereby indicating a "sampling" of the first content item by a user. The user can be associated with a user device, such as the mobile device 124, communications terminal 122, the media device 120, and/or the display device 121 of FIG. 1, or another user device. Thus, the first viewing event can be generated in response to a consumption of the first content item by the user device. The first viewing event can indicate a content identifier indicating the particular content item viewed, a start time of viewing, an end time of viewing, a viewing duration, a user identifier, a user device identifier, and potentially other data.

In step 804, it can be determined that the first content item is within a first genre of a plurality of genres. For example, the plurality of genres can include "sports," "movies," and/or "television shows." Thus, it can be determined that the first content item is within the "sports" genre, "as opposed to the "movies" or "television shows" genres. Determining that the first content item is within the first genre can comprise determining that the first content item is within the first genre based on metadata associated with the first content item. The metadata can be associated with transmitted data segments of the first content item. The metadata can be accessed via an electronic program guide (EPG) or other listing or index of the content items.

In step 806, a first affinity with respect to the first genre and the user can be determined. The first viewing event can contribute to (e.g., increase) the first affinity in response to the first content item being within the first genre and having a duration below the threshold. For example, given a first genre of "sports" and a threshold of five seconds, the first viewing event can contribute to the first affinity with respect to the "sports" genre" and the user if the first content item is within the "sports" category and the duration of the first viewing event is below five seconds. Using this example, viewing events with durations below the threshold but associated with content items in other genres (e.g., "movies") would not contribute to affinities with respect to the other genres.

Figure 9:
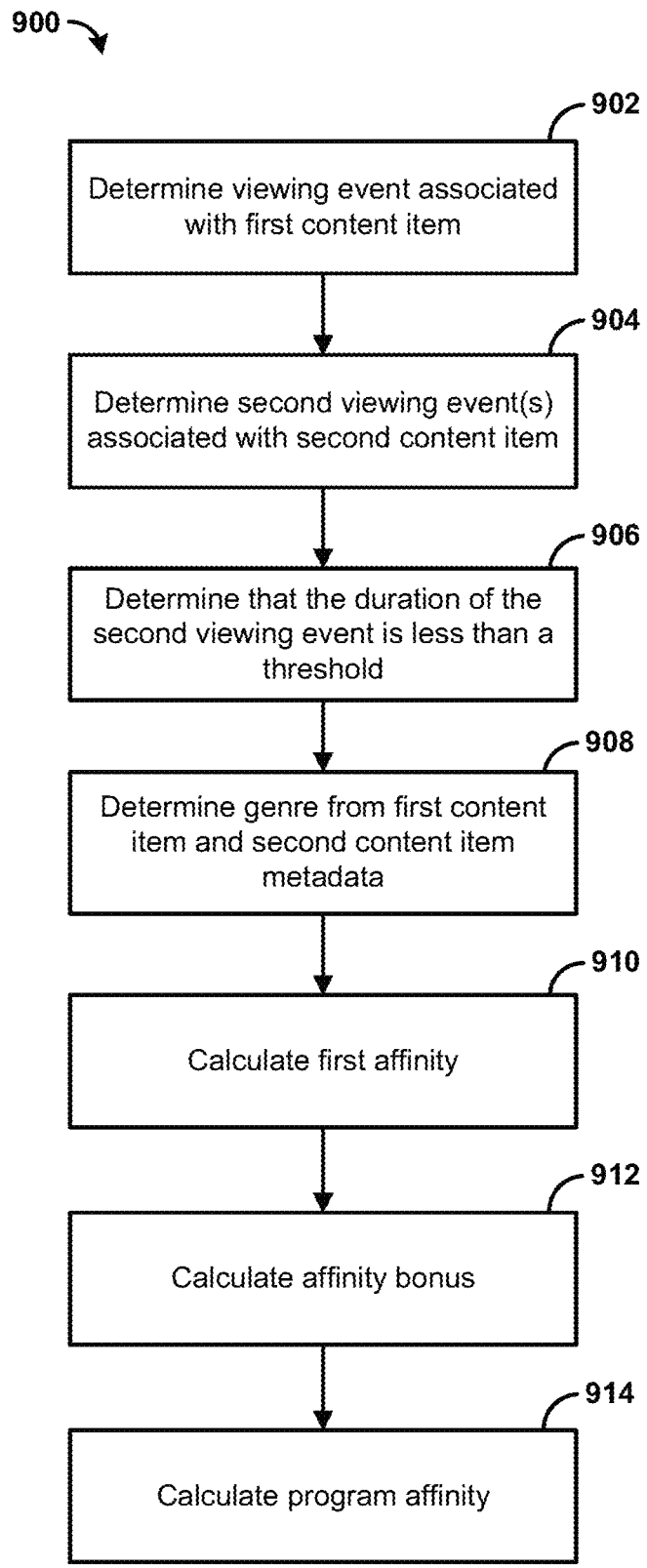
FIG. 9 is a flowchart depicting an example method.

FIG. 9 is a flowchart 900 of an example method. The method can be performed by one or more computing devices, such as the content source 127 and/or edge device 128 of FIG. 1, or another computing device as can be appreciated. Beginning with step 902, a first viewing event associated with a first content item and a user can be determined. The first viewing event can be associated with a user device, such as such as the mobile device 124, communications terminal 122, the media device 120, and/or the display device 121 or another user device as can be appreciated.

The first viewing event can be merged with one or more additional viewing events. The one or more additional viewing events can be contiguous to or overlapping with the first viewing event. The one or more additional viewing events can be separated from the first viewing event by a duration below a threshold. For example, the threshold used for merging the first viewing event and the second viewing event can correspond the sampling duration discussed below, e.g. one second, five seconds, one minute, five minutes, or any other appropriate duration. Thus, first and second viewing events separated by an instance of sampling would be merged into a single viewing event. Next, in step 904, a second viewing event associated with a second content item and the user can be determined. The first content item and the second content item can be delivered at least partially concurrently. Thus, The second viewing event can occur with respect to the second content item during a delivery of the first content item.

In step 906 it can be determined that the duration of the second viewing event is less than a threshold, e.g. one second, five seconds, one minute, five minutes, or any other appropriate duration, thereby indicating a "sampling" of the second content item by the user during a viewing of the first content item. In step 908, the genre for the first content item and second content item are determined from metadata for the respective first content item and second content item. The metadata can be associated with transmitted data segments of the first content item and second content item. The metadata can be accessed via an electronic program guide (EPG) or other listing or index of the content items. It can be determined that the genre of the first content item and second content item are the same based on the metadata. Thus, the "sampling" of the second content item indicates an affinity with respect to the first content item due to the first content item and the second content item sharing the same genre.

Next, in step 910, a first affinity can be determined (e.g., calculated) based on the first viewing event. The first affinity can be based on a duration of the first viewing event relative to the duration of the first content item. The first affinity can be based on a plurality of first viewing events associated with the first content item. The first affinity can be based on a total duration of the plurality of first viewing events.

In step 912 an affinity bonus can be determined (e.g., calculated) based on the second viewing event. The affinity bonus can include a sampling bonus based on the second viewing event. Determining the affinity bonus, e.g. the sampling bonus, can be performed in response to determining that the genre of the first content item and the second content item are the same as set forth in step 908. The sampling bonus can be weighted or scaled based on a duration of the first content item. The sampling bonus can be weighted or scaled based on a duration of the first content item viewed. The sampling bonus can be weighted or scaled based on a difference between a start time of a first viewing event for the first content item and an end time of the last viewing event for the first content item. Determining the sampling bonus can include determining a scalar to be applied to one of the durations defined above. The scalar can be dynamically determined based on a duration of sampling, a number of instances of sampling, or another factor. The scalar can be a predefined value for use in determining sampling bonuses. For example, a scalar can be determined or predefined to be 0.2. The scalar is to be applied to the total 1800 second (thirty minute) duration of a content item, resulting in a sampling bonus of 360. As another example, a scalar can be increased by 0.1 for each instance of sampling occurring for a given content item. Thus, for four instances of sampling occurring during a given content item, the resulting scalar would be 0.4. When applied to a viewed duration of 1000 seconds, the resulting sampling bonus would be 400. It is understood that the examples above are non-limiting, and that one skilled in the art can determine weights and/or scalars according to a genre and/or the desired results.

Next, in step 914, a total affinity for the user with respect to the first content item can be determined (e.g., calculated). Determining the total affinity can include adding the affinity bonus to the first affinity. A recommendation can be generated based on the total affinity. The recommendation can be generated based on a plurality of total affinities. The recommendation can be generated based on an aggregate affinity calculated as a function of a plurality of total affinities. Generating the recommendation can include grouping or classifying the user based on the program affinity. A recommendation can then be generated based on the grouping or classification of the user. The recommendation can include a promotion or advertisement for a content package, product, discount, or other incentive corresponding to the grouping or classification of the user. The recommendation can include a recommendation for one or more content items relevant to the grouping or classification of the user.

The methods and systems can be implemented on a computer 1001 as illustrated in FIG. 10 and described below. By way of example, the mobile device 124, application server 126, content source 127, and/or edge device 128 of FIG. 1 can be a computer as illustrated in FIG. 10. Similarly, the methods and systems disclosed can utilize one or more computers to perform one or more functions in one or more locations. FIG. 10 is a block diagram 1000 illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1001. The components of the computer 1001 can comprise, but are not limited to, one or more processors 1003, a system memory 1012, and a system bus 1013 that couples various system components including the one or more processors 1003 to the system memory 1012. The system can utilize parallel computing.

The system bus 1013 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1013, and all buses specified in this description can also be implemented over a wired or wireless network connection and each of the subsystems, including the one or more processors 1003, a mass storage device 1004, an operating system 1005, content software 1006, content data 1007, a network adapter 1008, the system memory 1012, an Input/Output Interface 1010, a display adapter 1009, a display device 1011, and a human machine interface 1002, can be contained within one or more remote computing devices 1014$a,b,c$ at physically separate locations, connected through buses of this form, in effect implementing a fully distributed system.

The computer 1001 typically comprises a variety of computer readable media. Exemplary readable media can be any available media that is accessible by the computer 1001 and comprises, for example and not meant to be limiting, both volatile and non-volatile media, removable and non-removable media. The system memory 1012 comprises computer readable media in the form of volatile memory, such as random access memory (RAM), and/or non-volatile memory, such as read only memory (ROM). The system memory 1012 typically contains data such as the content data 1007 and/or program modules such as the operating system 1005 and the content software 1006 that are immediately accessible to and/or are presently operated on by the one or more processors 1003.

The computer 1001 can also comprise other removable/non-removable, volatile/non-volatile computer storage media. By way of example, FIG. 10 illustrates the mass storage device 1004 which can provide non-volatile storage of computer code, computer readable instructions, data structures, program modules, and other data for the computer 1001. For example and not meant to be limiting, the mass storage device 1004 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1004, including by way of example, the operating system 1005 and the content software 1006. Each of the operating system 1005 and the content software 1006 (or some combination thereof) can comprise elements of the programming and the content software 1006. The content data 1007 can also be stored on the mass storage device 1004. The content data 1007 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

The user can enter commands and information into the computer 1001 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1003 via the human machine interface 1002 that is coupled to the system bus 1013, but can be connected by other interface and bus structures, such as a parallel port, game port, an IEEE 1394 Port (also known as a Firewire port), a serial port, or a universal serial bus (USB).

The display device 1011 can also be connected to the system bus 1013 via an interface, such as the display adapter 1009. It is contemplated that the computer 1001 can have more than one display adapter 1009 and the computer 1001 can have more than one display device 1011. For example, the display device 1011 can be a monitor, an LCD (Liquid Crystal Display), or a projector. In addition to the display device 1011, other output peripheral devices can comprise components such as speakers (not shown) and a printer (not shown) which can be connected to the computer 1001 via the Input/Output Interface 1010. Any step and/or result of the methods can be output in any form to an output device. Such output can be any form of visual representation, including, but not limited to, textual, graphical, animation, audio, tactile, and the like. The display device 1011 and computer 1001 can be part of one device, or separate devices.

The computer 1001 can operate in a networked environment using logical connections to one or more remote computing devices 1014a,b,c. By way of example, a remote computing device can be a personal computer, portable computer, smartphone, a server, a router, a network computer, a peer device or other common network node, and so on. Logical connections between the computer 1001 and a remote computing device 1014a,b,c can be made via a network 1015, such as a local area network (LAN) and/or a general wide area network (WAN). Such network connections can be through the network adapter 1008. The network adapter 1008 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1005 are illustrated herein as discrete blocks, although it is recognized that such programs and components reside at various times in different storage components of the computing device 1001, and are executed by the one or more processors 1003 of the computer. An implementation of the content software 1006 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. One or more non-transitory computer-readable media storing processor-executable instructions that, when executed by at least one processor, cause the at least one processor to:
   determine that a duration of a first viewing event associated with a first content item is less than a threshold;
   maintain, based on the duration of the first viewing event being less than the threshold and a first genre associated with the first content item, a first affinity level associated with the first genre;
   determine that a duration of a second viewing event associated with a second content item is less than the threshold; and
   increase, based on the duration of the second viewing event being less than the threshold and a second genre associated with the second content item, a second affinity level associated with the second genre.

2. The one or more non-transitory computer-readable media of claim 1, wherein the processor-executable instructions that, when executed by the at least one processor, cause the at least one processor to increase the second affinity level, cause the at least one processor to increase the second affinity level by a quantity of a sampling bonus.

3. The one or more non-transitory computer-readable media of claim 1, wherein the processor-executable instructions that, when executed by the at least one processor, cause the at least one processor to increase the second affinity level, cause the at least one processor to apply a program affinity weight to the second affinity level, wherein the program affinity weight is based on at least one of: a time parameter, an importance parameter, or a content parameter associated with the second content item.

4. The one or more non-transitory computer-readable media of claim 1, wherein the processor-executable instructions, when executed by the at least one processor, further cause the at least one processor to determine a switch to a third viewing event associated with the second genre by a user device, wherein the switch occurs during a delivery of the second content item.

5. The one or more non-transitory computer-readable media of claim 1, wherein the first genre comprises at least one of: a movie genre or a television show genre, and the second genre comprises a sports genre.

6. The one or more non-transitory computer-readable media of claim 1, wherein:
the first viewing event comprises at least one of: an interaction between a user and the first content item, an event indicative of delivery of the first content item, a viewing duration of the first content item, a selection of the first content item for delivery to a user device, or a tuning to a channel or a frequency for delivery of the first content item; and
the second viewing event comprises at least one of: an interaction between the user and the second content item, an event indicative of delivery of the second content item, a viewing duration of the second content item, a selection of the second content item for delivery to the user device, or a tuning to a channel or a frequency for delivery of the second content item.

7. The one or more non-transitory computer-readable media of claim 1,
wherein the processor-executable instructions, when executed by the at least one processor, further cause the at least one processor to determine the second affinity level; and
wherein the processor-executable instructions that, when executed by the at least one processor, cause the at least one processor to determine the second affinity level, cause the at least one processor to:
determine an average viewing duration of each viewing event of a plurality of viewing events associated with the second content item; and
divide the average viewing duration by a total duration of the second content item.

8. The one or more non-transitory computer-readable media of claim 1, wherein the processor-executable instructions, when executed by the at least one processor, further cause the at least one processor to:
determine, based on metadata associated with the first content item, the first genre; and
determine, based on metadata associated with the second content item, the second genre.

9. A system comprising:
a computing device configured to:
determine that a duration of a first viewing event associated with a first content item is less than a threshold;
maintain, based on the duration of the first viewing event being less than the threshold and a first genre associated with the first content item, a first affinity level associated with the first genre;
determine that a duration of a second viewing event associated with a second content item is less than the threshold; and
increase, based on the duration of the second viewing event being less than the threshold and a second genre associated with the second content item, a second affinity level associated with the second genre; and
a user device configured to:
receive the first content item.

10. The system of claim 9, wherein to increase the second affinity level, the computing device is configured to increase the second affinity level by a quantity of a sampling bonus.

11. The system of claim 9, wherein to increase the second affinity level, the computing device is configured to apply a program affinity weight to the second affinity level, wherein the program affinity weight is based on at least one of: a time parameter, an importance parameter, or a content parameter associated with the second content item.

12. The system of claim 9, wherein the computing device is further configured to determine a switch to a third viewing event associated with the second genre by the user device, wherein the switch occurs during a delivery of the second content item.

13. The system of claim 9, wherein the first genre comprises at least one of: a movie genre or a television show genre, and the second genre comprises a sports genre.

14. The system of claim 9, wherein:
the first viewing event comprises at least one of: an interaction between a user and the first content item, an event indicative of delivery of the first content item, a viewing duration of the first content item, a selection of the first content item for delivery to the user device, or a tuning to a channel or a frequency for delivery of the first content item; and
the second viewing event comprises at least one of: an interaction between the user and the second content item, an event indicative of delivery of the second content item, a viewing duration of the second content item, a selection of the second content item for delivery to the user device, or a tuning to a channel or a frequency for delivery of the second content item.

15. The system of claim 9, wherein the computing device is further configured to determine the second affinity level, wherein to determine the second affinity level, the computing device is configured to:
determine an average viewing duration of each viewing event of a plurality of viewing events associated with the second content item; and
divide the average viewing duration by a total duration of the second content item.

16. The system of claim 9, wherein the computing device is further configured to:
determine, based on metadata associated with the first content item, the first genre; and
determine, based on metadata associated with the second content item, the second genre.

17. One or more non-transitory computer-readable media storing processor-executable instructions that, when executed by at least one processor, cause the at least one processor to:
determine a duration of a first viewing event associated with a first content item, wherein the first content item is associated with a first genre;
determine a duration of a second viewing event associated with a second content item, wherein the second content item is associated with a second genre;

determine, based on the duration of the first viewing event and the first genre, a first affinity associated with the first genre;

determine, based on the duration of the second viewing event and the second genre, a second affinity associated with the second genre; and increase, based on the duration of the second viewing event and the second genre, a quantity of the second affinity.

18. The one or more non-transitory computer-readable media of claim 17, wherein the first genre is different from the second genre.

19. The one or more non-transitory computer-readable media of claim 17, wherein the processor-executable instructions that, when executed by the at least one processor, cause the at least one processor to increase the quantity of the second affinity, cause the at least one processor to increase the second affinity based on a sampling bonus associated with a plurality of content items corresponding to the second genre.

20. The one or more non-transitory computer-readable media of claim 19, wherein the processor-executable instructions that, when executed by the at least one processor, cause the at least one processor to increase the quantity of the second affinity based on the sampling bonus, cause the at least one processor to apply a program affinity weight to the second affinity, wherein the program affinity weight is based on at least one of: a time parameter, an importance parameter, or a content parameter associated with the first content item.

21. The one or more non-transitory computer-readable media of claim 17, wherein the processor-executable instructions, when executed by the at least one processor, further cause the at least one processor to maintain, based on the duration of the first viewing event and the first genre, a quantity of the first affinity.

22. The one or more non-transitory computer-readable media of claim 17, wherein the first genre comprises at least one of: a movie genre or a television show genre, and the second genre comprises a sports genre.

23. A system comprising:
a computing device configured to:
    determine a duration of a first viewing event associated with a first content item, wherein the first content item is associated with a first genre;
    determine a duration of a second viewing event associated with a second content item, wherein the second content item is associated with a second genre;
    determine, based on the duration of the first viewing event and the first genre, a first affinity associated with the first genre;
    determine, based on the duration of the second viewing event and the second genre, a second affinity associated with the second genre; and
    increase, based on the duration of the second viewing event and the second genre, a quantity of the second affinity; and
a user device configured to:
    receive the first content item.

24. The system of claim 23, wherein the first genre is different from the second genre.

25. The system of claim 23, wherein to increase the quantity of the second affinity, the computing device is configured to increase the second affinity based on a sampling bonus associated with a plurality of content items corresponding to the second genre.

26. The system of claim 25, wherein to increase the quantity of the second affinity based on the sampling bonus, the computing device is configured to apply a program affinity weight to the second affinity, wherein the program affinity weight is based on at least one of: a time parameter, an importance parameter, or a content parameter associated with the first content item.

27. The system of claim 23, wherein the computing device is further configured to maintain, based on the duration of the first viewing event and the first genre, a quantity of the first affinity.

28. The system of claim 23, wherein the first genre comprises at least one of: a movie genre or a television show genre, and the second genre comprises a sports genre.

* * * * *